(12) United States Patent
Bares et al.

(10) Patent No.: US 6,902,016 B2
(45) Date of Patent: Jun. 7, 2005

(54) PIVOTING PANEL FOR MECHANICAL CONTROL DISENGAGEMENT

(75) Inventors: Mark F. Bares, Oakes, ND (US); James H. Page, Bottineau, ND (US)

(73) Assignee: Clark Equipment Company, Woodcliff Lake, NJ (US)

(*) Notice: Subject to any disclaimer, the term of this patent is extended or adjusted under 35 U.S.C. 154(b) by 240 days.

(21) Appl. No.: 10/071,559

(22) Filed: Feb. 8, 2002

(65) Prior Publication Data

US 2003/0079931 A1 May 1, 2003

Related U.S. Application Data

(60) Provisional application No. 60/335,197, filed on Nov. 1, 2001.

(51) Int. Cl.[7] ............................................. B62D 51/04
(52) U.S. Cl. ........................ 180/19.3; 180/305; 180/6.48
(58) Field of Search ................................. 180/305, 326, 180/19.1, 19.2, 19.3, 6.48; 56/10.5, 10.8, 11.2, 11.3, 11.5, 11.6, 11.7, 11.8, 14.7, 14.8; 37/244, 245, 253, 252; 192/224; 267/73, 74, 166

(56) References Cited

U.S. PATENT DOCUMENTS

| | | | |
|---|---|---|---|
| 1,618,880 A | 2/1927 | Johnson | |
| 1,701,118 A | 2/1929 | Peterson | |
| 2,120,459 A | 6/1938 | Brown ........................ 180/83 |
| 3,147,816 A | 9/1964 | Howard et al. .............. 180/82 |
| 3,147,818 A * | 9/1964 | Howard et al. ............ 180/19.1 |
| 3,899,935 A | 8/1975 | Jiles ............................ 74/473 |
| 3,942,601 A | 3/1976 | Smith .......................... 180/82 |
| 3,965,657 A * | 6/1976 | Jespersen ................. 56/10.2 R |
| 4,335,566 A | 6/1982 | Hurd ........................... 56/11.8 |
| 4,361,201 A | 11/1982 | Hallstedt et al. .......... 180/19 H |
| 4,363,376 A | 12/1982 | Sjoberg et al. ............. 180/275 |
| 4,541,497 A * | 9/1985 | Riediger et al. ........... 180/6.48 |
| 4,546,840 A | 10/1985 | Yukishige et al. .......... 180/169 |
| 4,558,558 A | 12/1985 | Horner, Jr. et al. .......... 56/11.3 |
| 4,869,124 A * | 9/1989 | Czeban et al. ............... 74/526 |
| 4,991,681 A | 2/1991 | Paulson ...................... 180/275 |
| 5,106,256 A | 4/1992 | Murakami et al. .......... 414/687 |
| 5,138,824 A * | 8/1992 | Oshima et al. .......... 56/10.2 R |
| 5,146,735 A | 9/1992 | McDonner .................... 56/11.3 |
| 5,307,880 A | 5/1994 | Woerner ....................... 172/19 |
| 5,355,661 A | 10/1994 | Tomiyama ................... 56/10.8 |
| 5,647,721 A * | 7/1997 | Rohrbaugh ................. 414/686 |
| 6,021,373 A | 2/2000 | Zuercher et al. ............ 701/300 |
| 6,067,872 A | 5/2000 | Miyahara et al. .......... 74/473.3 |
| 6,098,385 A * | 8/2000 | Turk ............................ 56/11.3 |
| 6,105,348 A * | 8/2000 | Turk et al. ................... 56/10.5 |
| 6,128,971 A * | 10/2000 | Papasideris ............ 74/471 XY |
| 6,460,640 B1 * | 10/2002 | Keagle et al. ............. 180/19.3 |
| 6,588,523 B2 * | 7/2003 | Heimbrock et al. ....... 180/65.5 |
| 6,709,223 B2 * | 3/2004 | Walto et al. ................ 414/685 |

FOREIGN PATENT DOCUMENTS

JP                5-278491        * 5/1993    ........... B60K/23/02

* cited by examiner

*Primary Examiner*—Brian L. Johnson
*Assistant Examiner*—J. Allen Shriver
(74) *Attorney, Agent, or Firm*—Westman, Champlin & Kelly, P.A.

(57) ABSTRACT

A small or mini loader is operated by a platform standing on the ground or other surface supporting the loader, and at the rear of the machine. Hydraulic control levers operate drives on opposite sides of the machine, and the control levers are pulled rearwardly from a stopped position to effect the rearward drive. A pivoting panel is mounted on the rear of the frame and has a wall portion that protrudes outwardly from the rear of the machine. When the lower end of the pivoting panel engages an obstruction or other item that provides a force tending to move the lower end of the panel forwardly relative to the frame, an actuator arm will move to cause control levers that are in a rearward drive position to be moved to the stopped position.

14 Claims, 6 Drawing Sheets

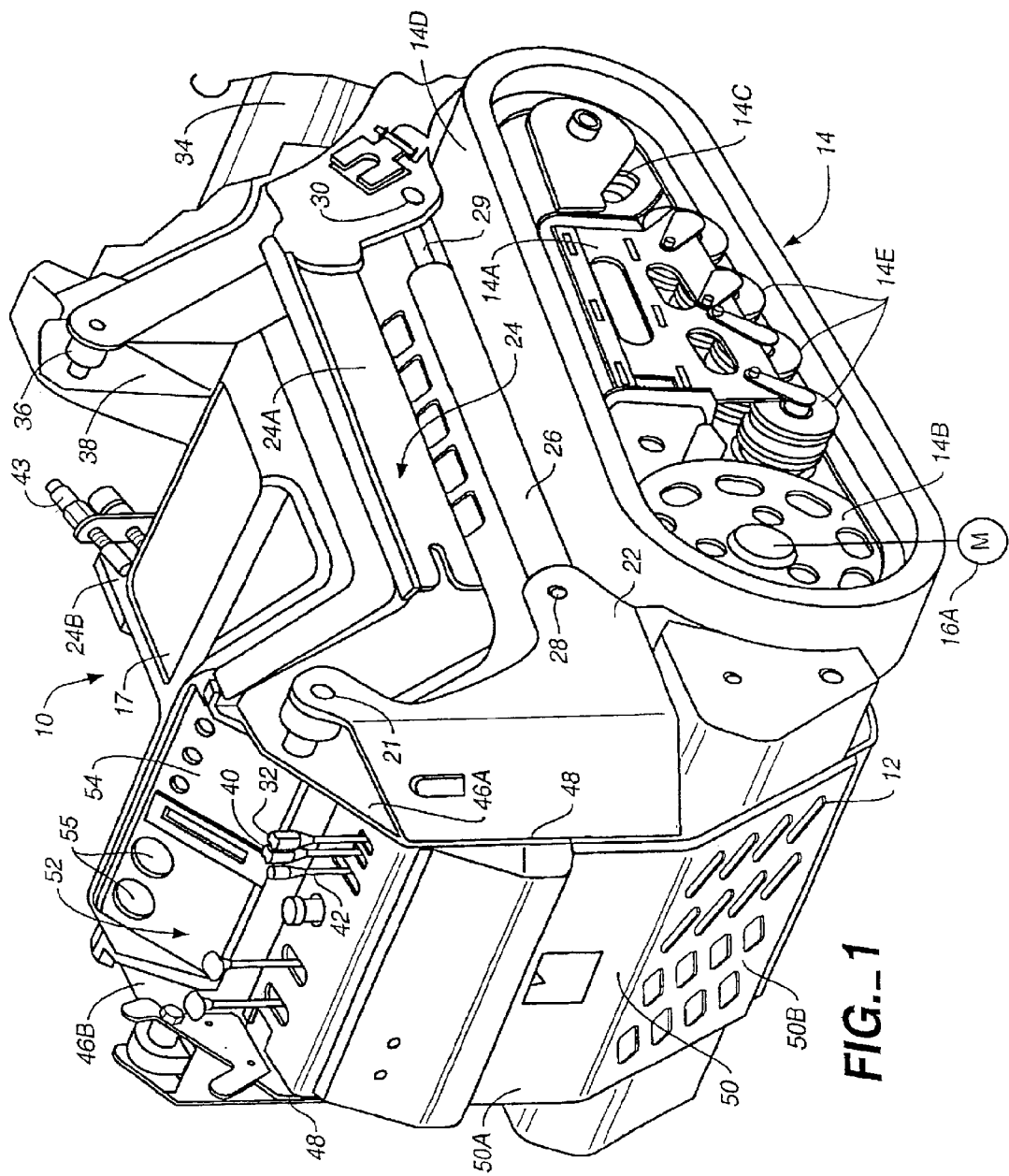
FIG._1

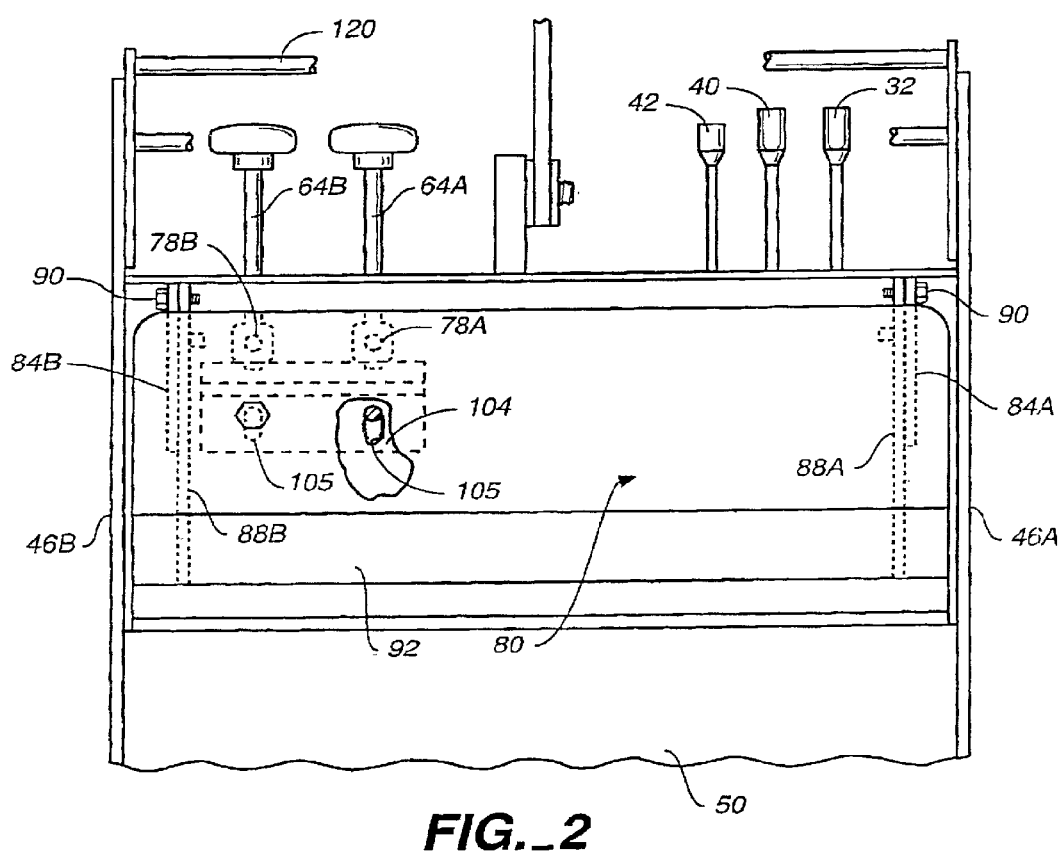
FIG._2

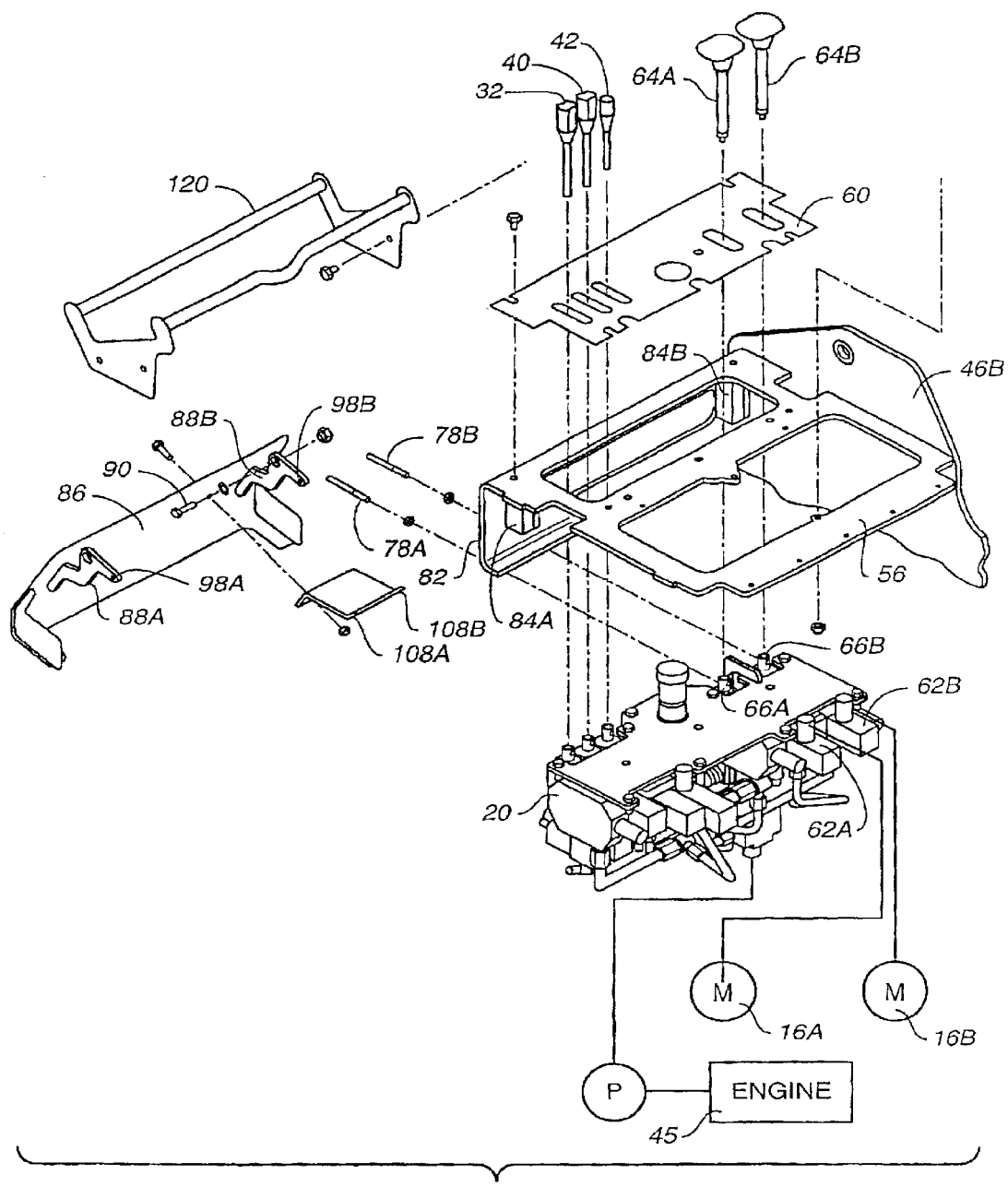
FIG._3

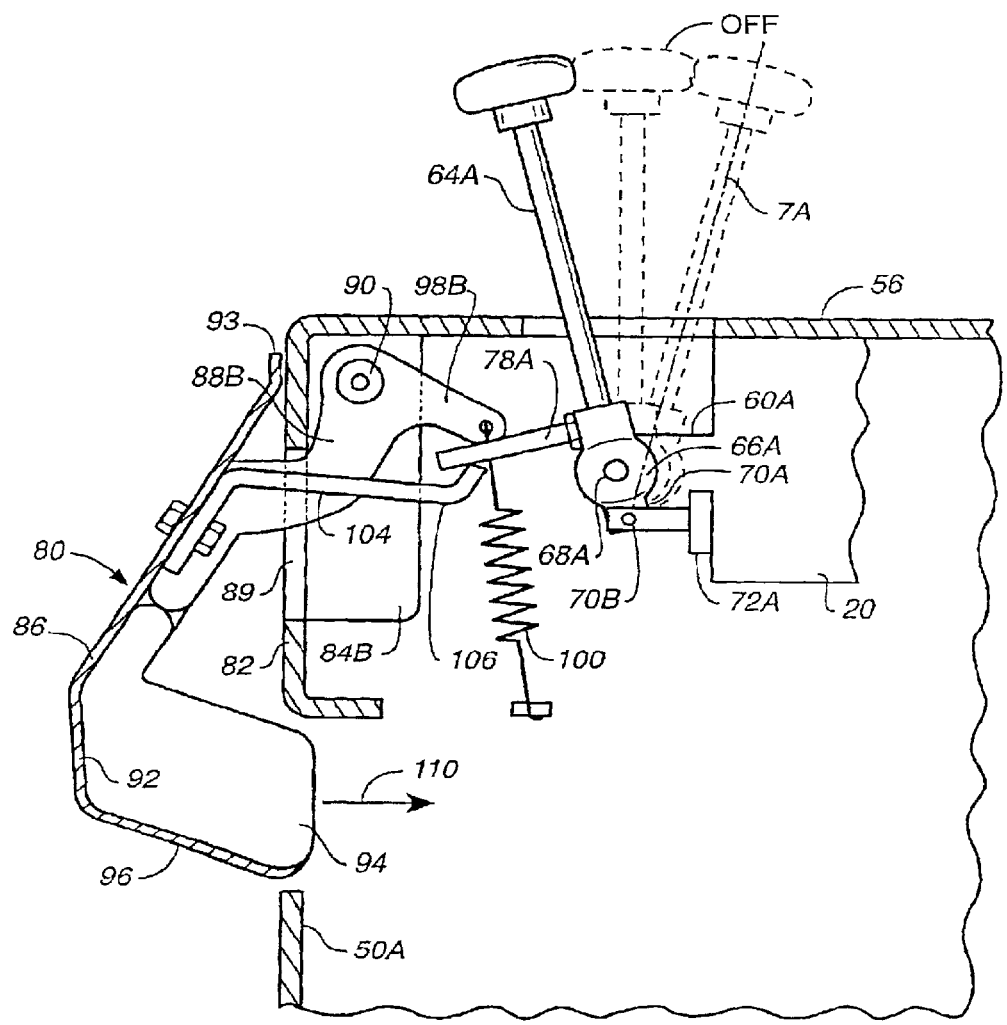
FIG._4

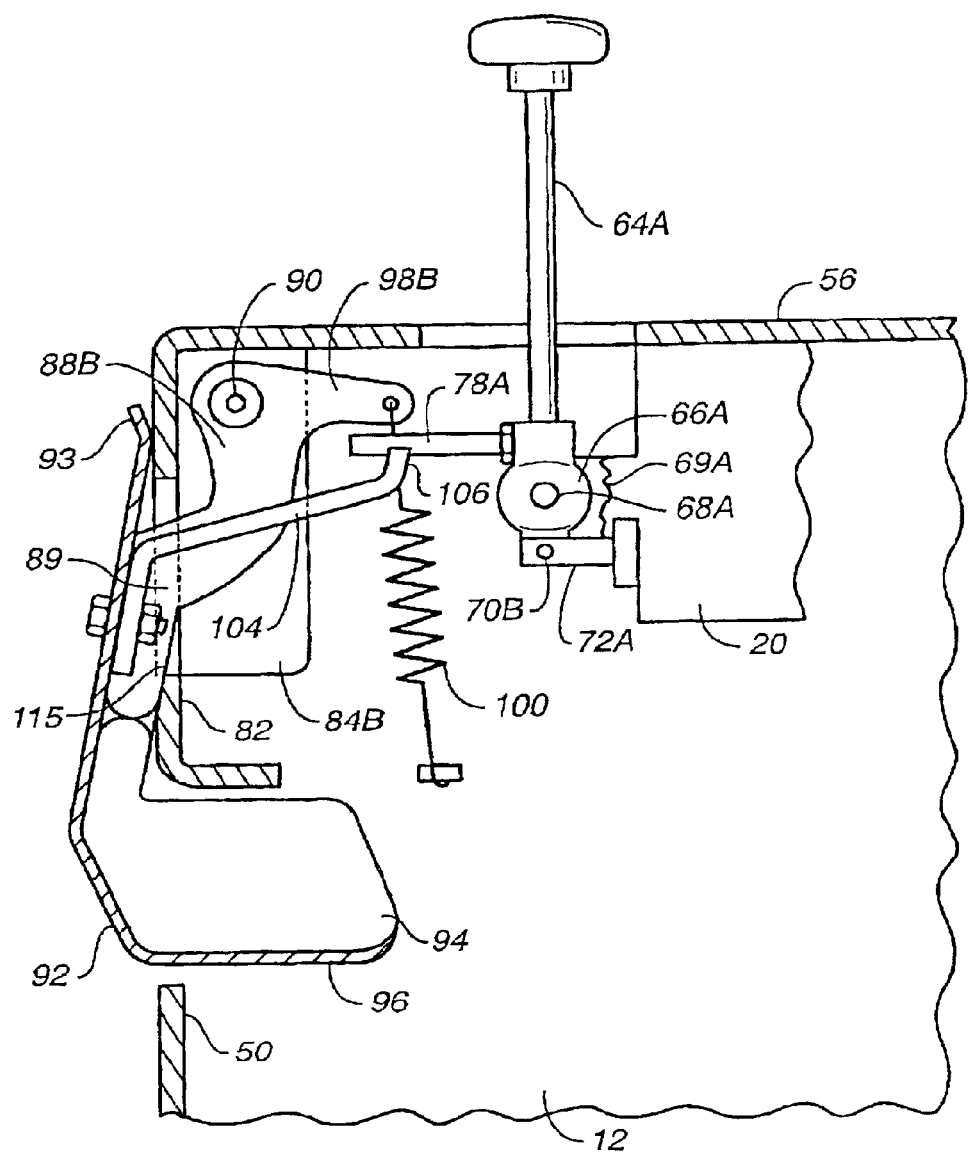
FIG._5

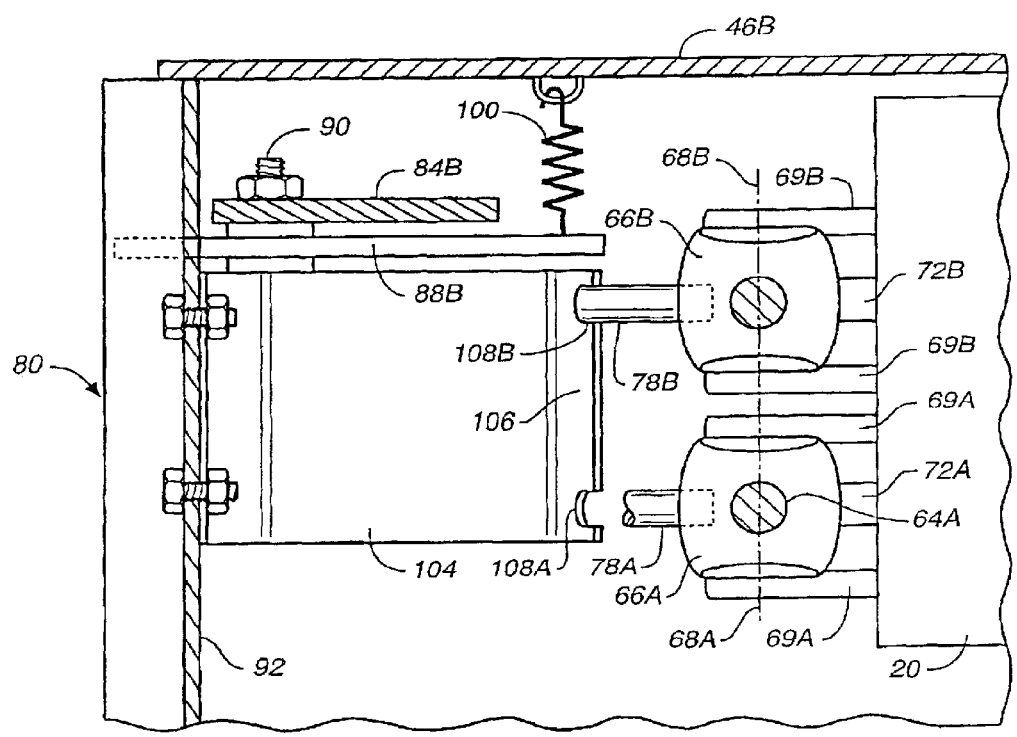
FIG._6

PIVOTING PANEL FOR MECHANICAL CONTROL DISENGAGEMENT

The present application is based on and claims the benefit of priority on U.S. provisional patent application Ser. No. 60/335,197, filed Nov. 1, 2001, the content of which is hereby incorporated by reference in its entirety.

BACKGROUND OF THE INVENTION

The present invention relates to a pivoting panel on a work vehicle that is positioned so that if the work vehicle is being propelled and the panel engages an object that is either stationary or moving at lower velocity, the panel will pivot to mechanically disengage the drive control. In the form shown, a small loader is designed so that the operator is standing or walking on the ground at the rear of the loader when the loader moves. The hydraulic drive motors are operated through control valves that are movable to a position for providing reverse drive. When the pivoting panel is pivoted from engaging the operator while traveling in reverse the panel also operates to move the valve or valves to a neutral position to stop the rearward movement of the loader.

Small or "mini" loaders, as well as other powered equipment, such as trenchers or garden equipment are made so the operator stands and walks at the rear of the machine. The equipment is power driven, and usually is operated from controls at the rear. The typical machine has hydraulic drive motors that are operated by valves mounted to be accessible to the operator at the rear of the machine. An internal combustion engine is used for powering a pump that provides the hydraulic fluid under pressure. When the machines are being driven in reverse, if the operator is standing still, it is desirable to have the drive disengaged if the operator is contacted. Also, if the unit is moving rearwardly and encounters a fixed object, it is desirable to have the drive disengage as well.

SUMMARY OF THE INVENTION

The present invention relates to an apparatus that will move to disengage drive controls on a self propelled machine or vehicle using a mechanical linkage when a movable actuator panel is engaged by an object that is either stationary or is overtaken. The vehicle travel is stopped after the actuator panel moves a selected amount.

The actuator panel as disclosed, is pivotally mounted on the machine frame, and is positioned to have a portion that extends out beyond a surface of the machine, so that the panel will be the first surface that is engaged by an object, toward which the machine may be moving. In the form shown, a pivoting wall portion or panel is mounted to extend from the rear of the machine, and is adjacent to the control levers for the hydraulic motors that are used for driving the machine in either forward or reverse direction.

Specifically, the control levers operate hydraulic valves, one for each of two drive motors on opposite sides of the machine or vehicle. These motors are reversible and the individual valves permit skid steering of the machine or vehicle. Each of the controls is independently operable, and the panel includes an arm member that will engage a portion of the control lever and will move either one or both of the control levers to a neutral position when the actuator panel is moved in a direction opposite from the direction of movement of the machine. In other words, the free end of the actuator panel pivots forwardly, relative to the vehicle when the vehicle is in reverse and engages an operator, object or an obstacle. The pivoting movement of the panel before moving the control valves to neutral is sufficient so that momentary encounters do not cause the vehicle to be stopped, but if the vehicle does continue to travel toward the operator or obstacle, the control or controls will be moved to neutral to stop the machine or vehicle from such movement.

Specifically, the actuator panel extends laterally across the width at the rear of the loader, which is the specific form of the machine shown, and has a lower portion that extends out beyond the rear edges of the frame of the loader. The upper portion of the panel is pivoted to the frame. The actuator panel carries an actuator arm or arms that has a width sufficient to span controls for both of the valves used for driving drive motors. The valve control levers have protruding arms or shafts that are engaged by the actuator arm when the panel is pivoted to its stopping position, and the levers are then moved to neutral.

BRIEF DESCRIPTION OF THE DRAWINGS

FIG. 1 is a rear perspective view of a small skid steer loader including the improvements of the present invention;

FIG. 2 is a rear view of the loader shown in FIG. 1;

FIG. 3 is a schematic exploded view of a stop panel and mounting illustrating components used with the present invention;

FIG. 4 is a sectional view taken generally along line 4—4 in FIG. 2;

FIG. 5 is a sectional view taken on the same sight line as FIG. 4 showing the actuator panel in position returning a drive control valve to a neutral position; and FIG. 6 is a sectional view taken along line 6—6 in FIG. 5.

DETAILED DESCRIPTION OF THE PREFERRED EMBODIMENTS

Referring to FIG. 1, a small or mini loader indicated generally at 10 is a walk behind power loader that has a body or frame 12. The frame 12 supports a track assembly 14 on each side of the loader propelling the loader 10 in forward and reverse directions through the use of drive hydraulic motors 16A and 16B. The drive motors are hydraulic motors operated from a pump 19 and a valve arrangement with a valve block shown generally at 20 at the upper end of a control panel for the loader. The pump 19 is driven by an internal combustion engine 45 mounted on the body or frame in a housing 17.

Each track assembly 14 includes a track frame 14A, a drive sprocket 14B and a front idler wheel 14C over which a track 14D is mounted. Bogie wheels 14E are also provided on the track frame 14A for support.

The loader body or frame 12 has upright supports 22 at the rear of the frame, and these supports 22 extend upwardly a little higher than waist level of an operator standing on the ground. The upright supports in turn pivotally support base or rear ends of a lift arm assembly 24 on pivots 21.

The lift arm assembly 24 includes individual lift arms 24A and 24B, on opposite sides of the body or frame.

The lift arm assembly 24 is raised and lowered with extendible and retractable double acting hydraulic cylinders or actuators 26, operating with hydraulic pressure from the pump 19 and controlled by a valve having a control handle 32. The valve controlled by handle 32 is part of the valve block 20.

The cylinders 26 (there is one on each side, and only one is shown) have base ends pivotally mounted as at 28 to the upright portions of the body or frame 12, and the cylinders have extendible and retractable rods 29 that have rod ends that are pivotally mounted as at 30 to each lift arm of the lift arm assembly 24. The lift arm assembly has a bucket 34 at the front controlled by a bucket control hydraulic cylinder 36. The bucket control cylinder 36 that has its base end connected to an upright strut 38 on the lift arm assembly. The bucket control cylinder is operated with a control lever 40 that operates a valve in the valve block 20. A further lever 42 operates a valve in valve block 20 used for auxiliary attachments connected with couplers 43 to the loader hydraulic valve block 20 and pump 19.

The frame 12, in addition to the upright portions 22, has frame side plates 46A and 46B that are spaced apart across the width of the machine, and are just to the inside of the lift arms 24A and 24B. It can be seen that these side plates 46A and 46B terminate along vertical rear edges 48 that define the rear of the machine frame. A lower rear frame panel 50 is fixed to the side plates, and includes a vertical portion 50A and an inwardly sloped, downwardly extending portion 50B that has openings for permitting airflow into the engine compartment.

The operator's instrument and control station 52 is at the rear of the loader or machine, and this includes a panel 54 that has suitable instrumentation or gages 55 in place. Additionally, the operator station 52 includes the valve control levers 32, 40 and 42 for the hydraulic components such as the lift arms, the tilt cylinder, and auxiliary equipment, which are positioned on the right-hand side of the operator's station 52.

The valve control handles are mounted on the valve block 20, and as can be seen in FIG. 3, the valve block 20 includes the valves attached to the respective control handles. The valve block 20 is mounted onto a generally horizontal support plate 56 that welded to the side plates 46A and 46B. In FIG. 3, the side plate 46B is shown, but the other end of the support plate 56 would be welded or fixed to the side plate 46A. Plate 56 is a structural member on the frame that supports the valve block 20 in its working position. A cover plate 60 is placed over the top of the support plate 56. The valve block mounts underneath support plate 56 and openings or slots are provided for the various control handles.

The motors 16A and 16B are for the right and left drive tracks, respectively, these motors are reversible hydraulic motors that are controlled by valves in the valve block. As shown in FIG. 3, the motor 16A is controlled by a valve 62A, and the motor 16B is controlled by a valve 62B. The valves have internal spools that are linearly slidable along the length of the valve body shown in FIG. 3, and these motor control valves are controlled by levers 64A and 64B, respectively. As shown schematically in FIGS. 4, 5 and 6, each of the spool valves has a hub for pivotally mounting control levers on the valve block.

The control lever 64A is illustrated in FIG. 5 and it has a hub 66A which is pivotally mounted about an axis 68A to support ears 69A on the valve block 20. The hub 66A has a depending arm 70A (FIG. 4) that pivotally mounts to an ear on an end of a spool valve 72A on a pivot axis 70B. If the top of the valve control handle 64A is moved in forward or reverse direction, the spool valve 72A will also be moved, but in the opposite direction.

The control handles 64A and 64B will pivot through an arc as illustrated in FIG. 4, and the center position is an off position where the motor 16A is not being driven. Moving the control lever forwardly, to the line shown at 74A will cause the valve spool 72A to move to drive the motor 16A in a forward direction, and moving the valve back to the solid line position shown in FIG. 4 will cause the spool 72A to be moved in a position to drive the motor 16A in a reverse direction. Thus, the tactile feel for the control levers is correlated with the direction of the drive.

The control lever 64B operates in the same way. The control levers are individually operable, but are close enough so that one hand can be used for simultaneously pulling both of the levers back or pushing both of the them forward for driving both motors at once, to drive the loader or other vehicle in a straight line either forwardly or in reverse.

It can be seen that the hub 66A, has an actuator shaft 78A fixed thereto and the lever 64B has an actuator rod or shaft 78B (see FIG. 6). The rods or shafts 78A and 78B extend rearwardly. When the control levers and hubs move about their pivots the actuator shafts 78A and 78B swing in an arc about the same pivots 68A or 68B.

In order to provide for a return of the control valves to a neutral position where the motor 16A and 16B would not be driven if the vehicle engages a stationary object, such as an operator standing still while the vehicle moves, or any other stationary object, an actuator panel assembly 80 is utilized.

Referring to FIG. 3, the support plate 56 has a vertical rear panel portion 82 and this rear panel portion 82 has a pair of forwardly projecting mounting ears 84A and 84B thereon. The mounting ears 84A and 84B are also welded or fixed to the support plate 56 and are used for pivotally mounting an actuator panel assembly 86. The actuator panel 86 has pivot brackets 88A and 88B, fixed to a formed outer plate 92 that has pivot brackets pivotally mounted on the ears 84A and 84B, respectively, with pivot pins shown at 90 in FIG. 3. The pivot pins are mounted so the pivot axis of plate 92 is close in horizontal direction to the levers of the valve and a short distance above the pivot 70B, to obtain the desired mechanical advantage for releasing the levers when the panel assembly pivots, and to keep the linkages from getting too long.

As shown in FIGS. 4 and 5, the pivot bracket 88B is illustrated. The lower portions of the pivot or actuator plate extends through an opening 89 in the panel or wall 82. The plate 92 is fixed to flanges 94 that provide reinforcing support for an inturned bottom portion 96 of the actuator plate 92. Additionally, the pivot brackets 88A and 88B each have an extension 98A and 98B to which a separate spring shown schematically at 100 is attached. There is a spring 100 on each side of the actuator panel assembly 80, anchored to the respective side walls. The spring load urges the actuator panel assembly to pivot in a clockwise direction as seen in FIGS. 4 and 5, so that normally the panel assembly moves to a position where the bottom of plate 92 extends rearwardly so that it protrudes from the vertical portion SA of the back wall 50. The plate 92 also extends outwardly beyond the vertical edges 48 of the side panels 46A and 46B.

The plate 92 also mounts an actuator arm bracket 104, which bolts in position, and which can be adjusted through suitable slots 105 (FIG. 2) in the bracket 104. The actuator bracket 104 is bent so that it extends forwardly toward the valve block 20 when the actuator panel assembly 80 is mounted on its pivots 90. The bracket 104 has an upturned lip 106 that aligns with both of the shafts 78A and 78B. The lip 106 has edge recesses 108A and 108B (see FIGS. 3 and 6) that will cradle or receive the shafts 78A and 78B, respectively when the actuator panel assembly 80 is pushed inwardly about the pivots 90 against the spring load of the springs 100. The pivot axis of pins 90, the valve block and pivot axis 70B are positioned close together so the actuator bracket 104 and rods 78A are kept short. The pivot positions are selected to obtain adequate mechanical advantage for the panel actuation and a relatively short swing or movement of the lower end of plate 92.

It can be seen that when the actuator panel 86, forming a part of the assembly 80 is moved to the position shown in FIG. 4 under the spring load from spring 100 it will be positioned so that the flange 106 of the bracket 104 is below the actuator shaft 74A when the lever 64A is in its position to drive the loader rearwardly. Both of the levers 64A and 64B are considered to be in the rearward position, in FIG. 4, and if there is a load that tends to pivot the actuator panel assembly 80 inwardly as indicated by the arrow 110, the actuator panel will pivot about the pivots 90, and the bracket 104 will move upwardly, so that the flange or lip 106 will engage the shaft 74A and 74B and will exert a force to pivot the control levers to their neutral position. This neutral position is shown in FIG. 5, and this will then cause the vehicle to stop so that there will be no further movement toward the operator or the obstacle. The panel assembly 80 also is stopped by engagement of a portion of the pivot brackets 88A and 88B with the wall 82, as shown at 115 in FIG. 5. Other stops can be used.

When the obstacle is cleared, or in other words when the springs 100 return the actuator panel to the solid line position shown in FIG. 4, the machine, or loader, can then be driven in reverse again. The actuator panel assembly 80 also is mechanically stopped in the position shown in FIG. 4 by the upper lip 93 of plate 92, engaging the wall 82. The machine always can be driven forwardly by moving the control levers to the forward dotted line position shown in FIG. 4, indicated by the line 74A.

The actuator panel assembly is for stopping the movement of the machine or vehicle is sturdy, and is reliable as well. The springs 100 provide adequate force for keeping the panel assembly 80 in its rearward position except when it encounters the operator or an obstacle. The actuator panel is not moved sufficiently to disengage the control levers on spool valves by casual bumps and very short movements. However, when the actuator panel is moved sufficiently, the lip 106 will engage the actuator shafts to move the control valves to their neutral position.

The valve block 20 is shown schematically, since it is a standard valve block made by Walvoil, an Italian valve manufacturer. The control handles and the rods or shafts 78A and 78B can be replaced by a unitary formed handle of flat metal, where the upright handle portion and the rods that are engaged by the actuator are one piece. A hand rest or grip bracket 120 may also be mounted by the controls.

Although the present invention has been described with reference to preferred embodiments, workers skilled in the art will recognize that changes may be made in form and detail without departing from the spirit and scope of the invention.

What is claimed is:

1. An actuator panel for a control system on a powered machine having a frame having a pivoting control lever, said control lever having a shaft portion extending outwardly from a pivot axis of the control lever, the control system and the control lever being mounted on the frame for controlling a ground drive for the frame, the actuator panel being pivotally mounted on said frame, said actuator panel being urged in a first direction extending outwardly from the frame, and having an actuator bracket adjustably mounted on the actuator bracket adjacent to the shaft portion, the actuator bracket moving with the actuator panel to engage the control lever and to move the control lever to a selected position from a first position when the actuator panel pivots toward the frame.

2. The actuator panel of claim 1, wherein the powered machine is self-propelled, and said control controls movement of the frame in a rearward direction of movement, the actuator panel being mounted at a rear of the powered machine.

3. The actuator panel of claim 1, wherein said actuator panel is pivotally mounted on the frame at a first location adjacent a rear of the powered machine, and tapers rearwardly and downwardly at an angle.

4. An actuator panel for a control system on a powered machine having a frame, a control valve block mounted on the frame, a control lever pivotally mounted to the valve block about a pivot axis, said control lever having a shaft portion extending outwardly from the pivot axis of the control lever, the control system being mounted on the frame for controlling a ground drive for the frame, an actuator spool in said valve block and said actuator spool being linearly moveable and having a portion pivotally mounted to the lever at a second pivot spaced from the pivot of the lever to the valve block, the actuator panel being pivotally mounted on said frame, said actuator panel being urged in a first direction extending outwardly from the frame, and having an actuator bracket mounted thereon adjacent to the shaft portion, the control lever including an actuator rod extending in a direction toward the pivoting actuator panel, the actuator bracket moving to engage the control lever and to move the control lever to a selected position from a first position when the actuator panel pivots toward the frame.

5. The actuator panel of claim 4, wherein said valve block has a pair of spools, and two levers, each of the levers controlling movement of a drive for the machine frame, in fore and aft directions of movement, said levers being engageable with the actuator bracket in a first position of each of said levers which causes the frame to be propelled.

6. The actuator panel of claim 4, wherein said valve block is mounted adjacent a rear panel of the frame, said actuator panel being pivotally mounted to the rear portion of the frame and to the rear of said valve block, the actuator rod on said control lever extending between the pivotal mounting of the actuator panel and the pivotal mounting of the lever to the valve block, the actuator bracket engaging the rod at a position between the rear of the frame and the valve block.

7. The actuator panel of claim 6, wherein said valve block and a pivotal axis of the pivoting actuator panel are closely adjacent in lateral and fore and aft directions.

8. The actuator panel of claim 4, wherein said pivoting actuator panel has a major portion extending rearwardly of a rear panel of the frame, and wherein the actuator bracket extends through an opening in the rear panel toward the valve block.

9. The actuator panel of claim 5, wherein said first position of the levers moves the respective spool to drive the powered machine in a rearward direction, the levers having a central axis and extending above an upper panel of the frame for manual operation, said actuator rod being positioned substantially perpendicular to the central axis of the levers below the upper panel of the frame, and the actuator bracket on the pivoting actuator panel passing through a rear wall of the frame to align with the actuator rods on the levers, the actuator bracket having adjustment slots therein for receiving fasteners to secure the actuator bracket to the pivoting panel.

10. A powered machine having a frame, drive members on opposite sides of said frame controllable by hydraulic motors, the powered machine being operable by an operator standing on the surface supporting the machine, and at a rear of the machine, a hydraulic control valve block on the machine and having sliding valves with actuator levers pivoted relative to the valve block for controlling the respective motors for driving the drive members to move the machine selectively in forward and reverse directions upon movement of the actuator levers from a neutral position, the actuator levers extending above the frame for manual operation by an operator standing at the rear of the machine, a return member extending outwardly from each of the levers and swinging in an arc as the respective actuator levers are moved to move the sliding valves, and a pivoting actuator panel mounted to the frame and having a portion that extends outwardly from the rear of the frame, said pivoting actuator having a bracket mounted thereon, said pivoting actuator being urged to extend outwardly from the machine under a bias force, and being pivotable to move inwardly when a force is provided on the pivoting actuator tending to move the pivoting actuator toward the rear of the frame, said bracket engaging the return member on the respective actuator lever when the respective actuator lever is in a position to drive the respective drive member in reverse and the pivoting actuator pivoting to a position under such force to move the respective actuator levers to their respective neutral positions.

11. The machine of claim 10, wherein said pivoting actuator comprises an actuator panel extending laterally across the rear portions of the frame, and having pivot brackets for pivotally mounting the actuator panel on opposite sides of the frame.

12. The machine of claim 10, wherein the return members on the actuator levers comprise actuator rods extending outwardly from the respective actuator levers.

13. The machine of claim 11, wherein said actuator panel inclines rearwardly and downwardly from its pivotal mounting.

14. The machine of claim 11, wherein said actuator panel has a pair of mounting brackets that are pivotally mounted to side members of the frame, said mounting brackets extending rearwardly through openings in a rear wall of the frame, the actuator panel having a lower portion that extends outwardly from the rear of the frame a greater distance than an upper portion, whereby forces engaging the lower portion tend to pivot the actuator panel to a position to move the levers from a rearward drive position to the stopped position.

* * * * *